May 19, 1931.   A. C. McINTYRE ET AL   1,805,777
VALVE STRUCTURE
Filed Dec. 10, 1925   2 Sheets-Sheet 2

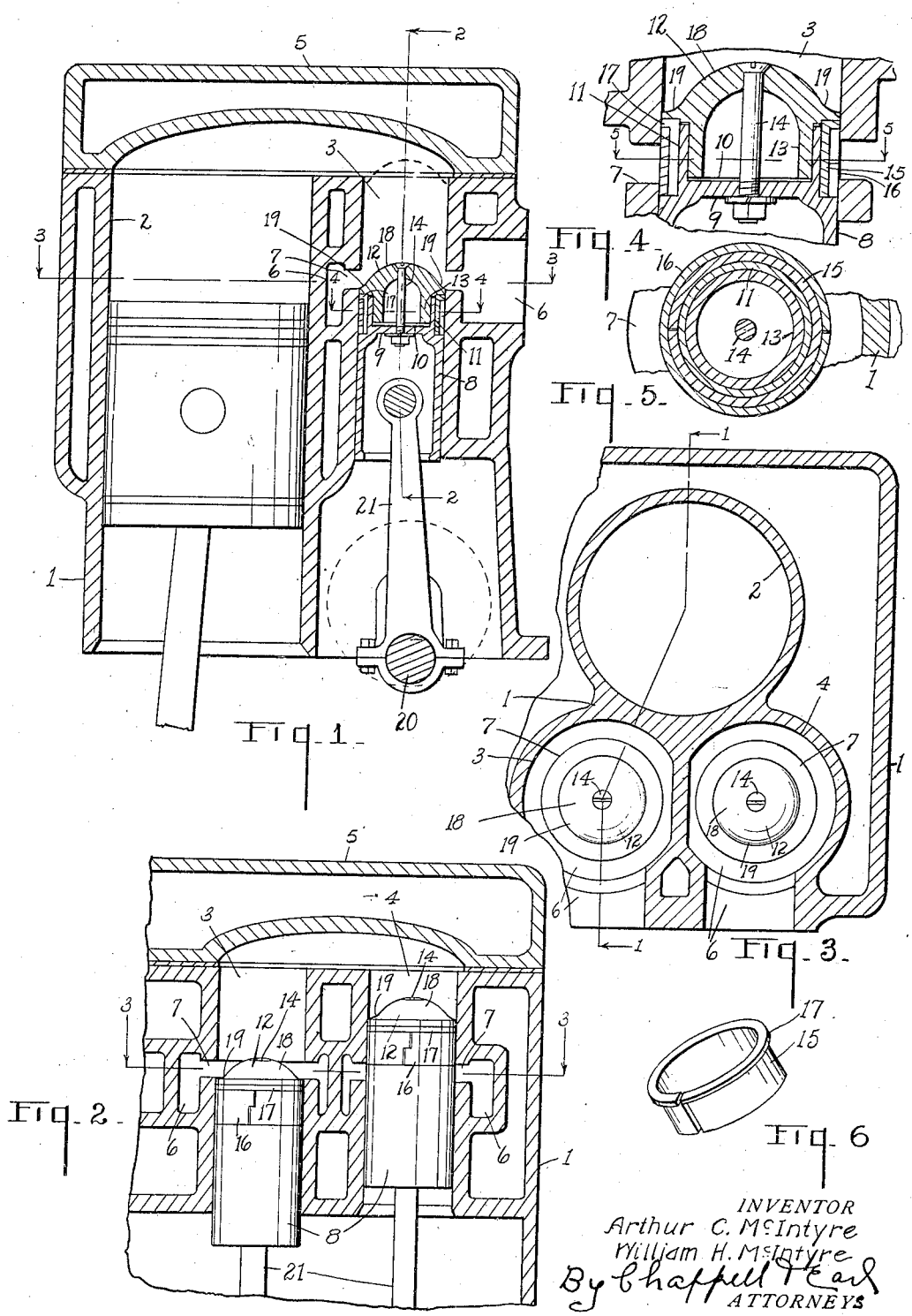

INVENTOR
Arthur C. McIntyre
William H. McIntyre
BY
Chappell Earl
ATTORNEYS

Patented May 19, 1931

1,805,777

UNITED STATES PATENT OFFICE

ARTHUR C. McINTYRE AND WILLIAM H. McINTYRE, OF KALAMAZOO, MICHIGAN

VALVE STRUCTURE

Application filed December 10, 1925. Serial No. 74,545.

Our improved valve structure is especially designed by us for embodiment in internal combustion engines and we have illustrated the same as we have so embodied it.

The main objects of this invention are:

First, to provide an improved valve structure of the piston type for internal combustion engines which is well adapted for both an intake and exhaust valve.

Second, to provide an improved valve structure for internal combustion engines which increases the portage and the efficiency of the engine.

Third, to provide an improved valve structure of the piston type which has a highly efficient packing.

Fourth, to provide an improved valve structure of the piston type in which the packing of the metal shape type may be put in shape without distortion.

Objects relating to details and economies of construction and operation of our invention will definitely appear from the detailed description to follow.

The invention is clearly defined and pointed out in the claims.

A structure which is a preferred embodiment of our invention is illustrated in the accompanying drawings, forming a part of this application, in which:

Fig. 1 is a detail vertical section on a line corresponding to broken line 1—1 of Fig. 3 of an internal combustion engine embodying our improvements.

Fig. 2 is a detail vertical section corresponding to line 2—2 of Fig. 1.

Fig. 3 is a horizontal section on a line corresponding to line 3—3 of Figs. 1 and 2.

Fig. 4 is an enlarged fragmentary vertical section corresponding to Fig. 1.

Fig. 5 is a detail section corresponding to line 5—5 of Fig. 4.

Fig. 6 is a perspective view of one of the packing elements.

In the drawings similar reference characters refer to similar parts throughout the several views, and the sectional views are taken looking in the direction of the little arrows at the ends of the section lines.

Figure 7:
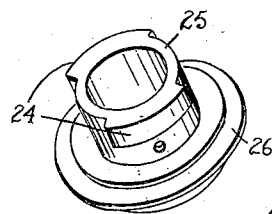
Fig. 7 is an inverted perspective view of a modified form of piston head member.
Figure 8:
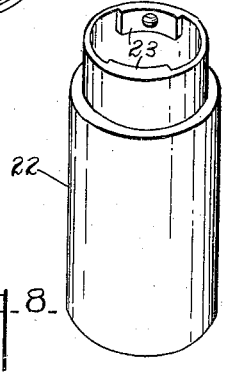
Fig. 8 is a perspective view of the body member of the piston complementing or belonging to the head member shown in Fig. 7.

Referring to the drawings, 1 represents a cylinder block only sufficient of which is illustrated to show one work or explosion cylinder 2 and coacting valve cylinders 3 and 4. The cylinder block is provided with a water jacket which, in the embodiment illustrated, is common to the explosion cylinder and also the valve cylinders.

The valve cylinders are disposed side by side in parallel relation to each other and to the explosion cylinder and communicate with the explosion cylinder at their upper ends, the head 5 being common to all the cylinders. The valve cylinders are surrounded with annular inlet and exhaust passages 6 which communicate with the valve cylinders through the unobstructed annular ports 7.

In the embodiment illustrated, the piston valves are duplicates so that a description of one will suffice. These valve pistons comprise a body member 8 which, in the preferred embodiment illustrated, is closed by the wall 9 at its inner end and has a recess 10 above this wall. The body member also has an annular packing channel 11 at its inner end, this channel being open at the end of the body member.

The head member 12 is provided with a neck 13 movably fitting within the recess 10. This head member is secured in the embodiment shown in Fig. 4, by the longitudinally disposed bolt 14 for limited motion relative to the body member, or in other words, the body and head members have a lost motion connection permitting limited movement.

The head member constitutes the end wall for the packing channel 11. The packing, preferably consisting of superimposed inner and outer split rings 15 and 16, is arranged in this packing channel, the rings being arranged to break joints, the inner ring having an outwardly projecting flange 17 at its upper end overlapping the upper edge of the outer ring.

The packing is of a width exceeding the width of the channel in the body member so that the packing is subjected to an end thrust of the members as the piston is moved in its stroke. The packing is also of a width exceeding the width of the port so that it is not necessary to provide bridges across the port. This prevents wearing curves in the piston rings and provides full unobstructed portage.

The valve heads preferably have spherical faces 18, as illustrated, which merge into the reverse curves 19 at the peripheries of the heads. This is found to provide for very free and unobstructed portage and flow through the ports and also by thus forming the heads there is little tendency for carbon or other matter to collect to obstruct the ports either on the heads or on the ports. The valves are connected to a crankshaft 20 by means of pitmen 21.

Another very great advantage in thus forming the ports is that valves of small diameter and short stroke may be employed without destroying or seriously restricting the desired portage. For instance, we have found that a valve 1½" in diameter having a 2" stroke with a port of a width of $\tfrac{13}{32}$ of an inch produces highly satisfactory results.

In the embodiment shown in Figs. 7, 8, 9 and 10, the body member of the valve 22 is provided with internal spaced lugs 23 adapted to be engaged by the external lugs 24 on the neck 25 of the head member 26. A screw 27 prevents rotation of the head, it being necessary, however, in assembling to align the slots in the rings to receive the screw and then adjust the rings to bring the joints out of register.

Figure 11:
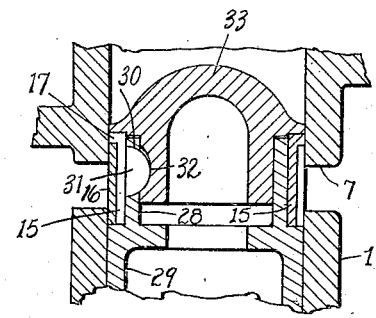
Fig. 11 is a detail section corresponding to that of Fig. 4 showing still another modification in the piston parts.
Figure 9:
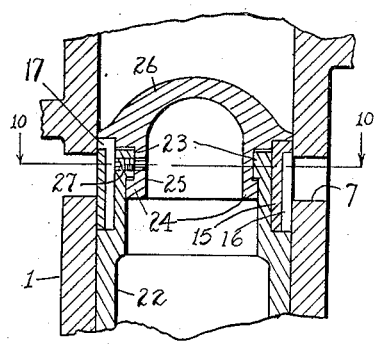
Fig. 9 is a detail section corresponding to that of Fig. 4 showing a modified form of connection for the body and piston head members.
Figure 10:
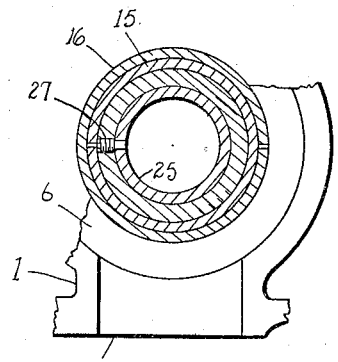
Fig. 10 is a detail section on a line corresponding to line 10—10 of Fig. 9.

In the modification shown in Fig. 11, the neck 28 of the body member 29 is provided with a key seat 30 for the key 31 which engages a slot 32 in the neck of the head member 33. This also requires aligning of the slots in the packing members for the insertion of the key, the packing members being adjusted to retain the key in place. It is found that there is very little tendency for the packing members to rotate after once adjusted.

This means of assembling permits the packing being put in place without distortion as occurs where it is sprung into the channels and further, as stated, the lost motion connection provides an end thrust providing a very effective sealing of the valve.

We have illustrated and described our improvements, as stated, in an internal combustion engine as we have embodied them in practice.

We have not attempted to illustrate or describe other adaptations and embodiments as we believe the disclosure made will enable those skilled in the art to embody or adapt our improvements as may be desired.

Having thus described our invention, what we claim as new and desire to secure by Letters Patent, is:

1. In a valve structure, the combination of a cylinder open at the top and having an annular surrounding passage communicating with the cylinder through a continuous annular slot-like port, a piston valve body member having a recess in its inner end and an annular packing ring channel open at the inner end of the body member, a head member constituting an end wall for the packing ring channel, said head member having a reduced neck movably fitting said recess in said body member, a connection for said head member to said body member permitting limited movement thereof relative to the body member, and a packing including a pair of superimposed split rings arranged in said channel to break joints, the inner ring having a flange at its head end overhanging the outer ring, the width of the packing exceeding the width of the port and also exceeding the depth of said channel in said body member whereby the packing is subject to the thrust of the piston members.

2. In a valve structure, the combination of a cylinder open at the top and having an annular surrounding passage communicating with the cylinder through a continuous annular slot-like port, a piston valve body member having a recess in its inner end and an annular packing ring channel open at the inner end of the body member, a head member constituting an end wall for the packing ring channel, said head member having a reduced neck movably fitting said recess in said body member, a connection for said head member to said body member permitting limited movement thereof relative to the body member, and a packing arranged in said channel, the width of the packing exceeding the width of the port and also exceeding the depth of said channel in said body member whereby the packing is subject to the thrust of the piston members.

3. In a valve structure, the combination of a cylinder open at the top and having an annular surrounding passage communicating with the cylinder through a continuous annular slot-like port, a piston valve body member having a recess in its inner end and an annular packing ring channel open at the inner end of the body member, a head member constituting an end wall for the packing ring channel and having a spherically curved face merging into a reverse curve extending to the periphery of the piston, said head member having a reduced neck movably fitting said recess in said body member, a connection for said head member to said body member permitting limited movement thereof relative to the body member, and a packing arranged in said channel, the width of the packing exceeding the width of the port and also exceeding the depth of said channel in said body member whereby the packing is subject to the thrust of the piston members.

4. In a valve structure, the combination of a cylinder open at the top and having an annular surrounding passage communicating with the cylinder through a continuous annular slot-like port, a piston valve body member having a packing ring channel open at its inner end, a head member constituting an end wall for the packing ring channel and having a limited lost motion connection to said body member, said head member having a spherically curved face merging into a reverse curve extending to the periphery of the piston, and a packing of a width exceeding the width of the port and the depth of the channel in said body member whereby the packing is subject to the thrust of the piston members.

5. In a valve structure, the combination of a cylinder open at the top and having an annular surrounding passage communicating with the cylinder through a continuous annular slot-like port, a piston valve body member having a packing ring channel open at its inner end, a head member constituting an end wall for the packing ring channel and having a limited lost motion connection to said body member, and a packing of a width exceeding the width of the port and the depth of the channel in said body member whereby the packing is subject to the thrust of the piston members.

6. In a valve structure, the combination of a cylinder open at the top and having a port intermediate its ends, a piston valve body member having a packing ring channel open at its inner end, a head member constituting an end wall for the packing ring channel and having a limited lost motion connection to said body member, and a packing of a width exceeding the depth of the channel in said body member whereby the packing is subject to the thrust of the piston members.

7. In a valve structure, the combination of a cylinder having a port intermediate the ends thereof, a piston valve body member having an annular packing ring channel open at the inner end of the body member, a head member constituting an end wall for the packing ring channel and having a lost motion connection to said body member, and a packing including a pair of superimposed split rings arranged in said channel to break joints, the inner ring having a flange at its upper end overhanging the outer ring, the width of the packing exceeding the depth of the channel in said body member whereby the packing is subject to the thrust of the piston members.

8. In a valve structure, the combination of a cylinder having a port intermediate the ends thereof, a piston valve body member having an annular packing ring channel open at the inner end of the body member, a head member constituting an end wall for the packing ring channel and having a lost motion connection to said body member, and a packing arranged in said channel, the width of the packing exceeding the depth of the channel in said body member whereby the packing is subject to the thrust of the piston members.

9. In a valve structure, the combination of a cylinder having a port intermediate the ends thereof, a piston valve comprising complementary members coacting to provide a packing ring channel and having a lost motion connection, and a packing arranged in said channel to receive the thrust of said valve members.

10. In a valve structure, the combination of a cylinder having a port intermediate the ends thereof, a piston valve body member having an annular packing ring channel open at the inner end of the body member, a head member constituting an end wall for the packing ring channel detachably secured to said body member, and a packing including a pair of superimposed split rings arranged in said channel to break joints, the inner ring having a flange at its upper end overhanging the outer ring.

In witness whereof we have hereunto set our hands.

ARTHUR C. McINTYRE.
WILLIAM H. McINTYRE.